(12) United States Patent
Ferrero

(10) Patent No.: US 6,714,849 B1
(45) Date of Patent: Mar. 30, 2004

(54) SYSTEM AND A METHOD FOR THE CONTROL OF VARIABLE-RATIO TRANSMISSIONS

(75) Inventor: Pietro Ferrero, Rhode-St-Genese (BE)

(73) Assignee: Ferrero S.p.A. (IT)

( * ) Notice: Subject to any disclaimer, the term of this patent is extended or adjusted under 35 U.S.C. 154(b) by 44 days.

(21) Appl. No.: 10/069,046
(22) PCT Filed: Aug. 21, 2000
(86) PCT No.: PCT/EP00/08125
§ 371 (c)(1),
(2), (4) Date: Apr. 30, 2002
(87) PCT Pub. No.: WO01/14203
PCT Pub. Date: Mar. 1, 2001

(30) Foreign Application Priority Data

Aug. 24, 1999 (IT) ........................ TO99A0722

(51) Int. Cl.[7] ............................... B62M 9/12
(52) U.S. Cl. ............... 701/51; 701/1; 280/261
(58) Field of Search ............... 701/1, 51, 57; 474/70; 280/261

(56) References Cited

U.S. PATENT DOCUMENTS

| | | | |
|---|---|---|---|
| 5,059,158 A | | 10/1991 | Bellio et al. |
| 5,213,548 A | * | 5/1993 | Colbert et al. ................ 474/71 |
| 5,261,858 A | * | 11/1993 | Browning .................... 474/69 |
| 5,356,348 A | | 10/1994 | Bellio et al. |
| 5,538,477 A | | 7/1996 | Bellio et al. |
| 5,569,104 A | | 10/1996 | Bellio et al. |
| 5,681,234 A | | 10/1997 | Ethington |
| 5,728,017 A | | 3/1998 | Bellio et al. |
| 5,922,035 A | * | 7/1999 | Chen ........................... 701/22 |
| 6,015,159 A | * | 1/2000 | Matsuo ...................... 280/238 |
| 6,047,230 A | * | 4/2000 | Spencer et al. ............... 701/57 |
| 6,192,300 B1 | * | 2/2001 | Watarai et al. ................ 701/1 |
| 6,459,222 B1 | * | 10/2002 | Chen ........................... 318/430 |

FOREIGN PATENT DOCUMENTS

| | | |
|---|---|---|
| DE | 196 42 605 A1 | 4/1998 |
| DE | 197 41 709 A1 | 3/1999 |
| EP | 0 543 453 A1 | 5/1993 |
| EP | 0 831 021 A2 | 3/1998 |
| EP | 0 827 903 A2/3 | 3/1998 |

* cited by examiner

Primary Examiner—Michael J. Zanelli
(74) Attorney, Agent, or Firm—Rothwell, Figg, Ernst & Manbeck

(57) ABSTRACT

A system for controlling a variable-ratio transmission is mounted on an apparatus (1) and associated with an actuator (2) for changing the transmission ratio, as well as operating means (3) for applying an input driving force to the transmission with a periodic action of given frequency. The system comprises first sensor means (5) which are sensitive to the driving force and can generate a respective first signal, second sensor means (6) which are sensitive to the speed of operation of the apparatus (1) and can generate a respective second signal, as well as a control device (4) which is sensitive to the first and second signals and can control the actuator (2) in dependence on the first and second signals. The control device (4) is configured to determine, from the first and second signals, a reference signal indicative or a reference value of the frequency (CR). This reference signal is compared with a third signal (7) indicative of the given frequency so as to identify a corresponding deviation signal (e). The control device (4) acts on the actuator (2) in order to change the transmission ratio so as to minimize the deviation signal (e).

18 Claims, 4 Drawing Sheets

SYSTEM AND A METHOD FOR THE CONTROL OF VARIABLE-RATIO TRANSMISSIONS

INTRODUCTION

The present invention addresses the problem of the control of variable-ratio transmissions.

A typical example of a transmission of this type, which will be referred to for simplicity in the following description, is that of a bicycle transmissions. In this connection, a method and a device for automatically controlling the transmission ratio of a bicycle so as automatically to identify the optimal ratio in dependence on the pedalling effort or force are known from EP-A-0 831 021.

The same subject is addressed in various other patent documents such as, for example, U.S. Pat. Nos. 5,059,158, 5,538,477, 5,356,348, 5,569,104 and 5,728,017, in which it can be seen that the control may be exerted either on the rear derailer or on the front derailer, or on both derailers of a sports cycle.

SUMMARY OF PREFERRED EMBODIMENTS OF THE INVENTION

The object of the present invention is to improve systems for controlling the ratio in variable-ratio transmissions, particularly with regard to the optimization of the interaction between an apparatus having such a transmission and an operator using the apparatus.

According to the present invention, this object is achieved by means of a system having the specific characteristics recited in the following claims. The invention also relates to the respective method of operation.

The application of the intention if particularly advantageous in the cycling field and, in particular, in the field of competitive cycling.

BRIEF DESCRIPTION OF THE DRAWINGS

The invention will now be described, purely by way of non-limiting example, with reference to the appended drawings, in which.

DESCRIPTION OF ILLUSTRATIVE PREFERRED EMBODIMENTS

Figure 1:
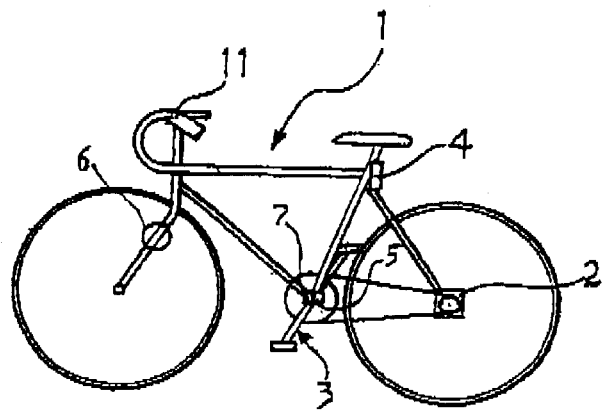
FIG. 1 shows schematically the application of a system according to the invention to a cycle such as a bicycle.

In FIG. 1, apparatus having a variable-ratio transmission is generally indicated 1. In the embodiment shown, the apparatus in question is constituted by a bicycle such as, for example, a sports cycle.

As well as comprising the parts which normally make up a bicycle of this type (which parts clearly do not need to be described and recited in detail herein), the bicycle 1 is equipped with the following devices:

an electrically-operated gearbox 2, shown here associated with the rear derailer of the bicycle 1 (in possible variants of the invention such a gearbox could alternatively or additionally be provided on the front derailer of the bicycle, if it has one); the gearbox concerned can thus change the position in which the bicycle chain (driven by the pedal crank 3 by means of which the cyclist applies the input driving force to the transmission) cooperates in a meshed arrangement with the sprockets associated with the rear wheel hub of the bicycle, in dependence on a control signal, a control device 4, the heart of which is preferably constituted by a microprocessor, for generating the control signal, and a set of sensors 5 to 7 which are sensitive to respective parameters of use of the bicycle and can generate respective signals to be received and processed by the device 4; these are, basically, a sensor 5 which can detect the pedalling force or effort exerted by the cyclist on the pedals (that is the driving force), a sensor 6 which is sensitive to the forward speed of the bicycle 1 (in general terms, the frequency or speed of operation of the apparatus represented herein by the bicycle 1), as well as a sensor 7 which is sensitive to the pedalling frequency, that is, the frequency of the periodic action by which the cyclist applies the input driving force by means of the pedal crank 3.

Although they are theoretically separate, the various sensors in question may in fact be combined with one another and/or with other components of the system.

For example, the sensor 7 which detects the pedaling frequency can advantageously be combined with the sensor 5 which detects the pedalling effort.

It should again be stated that all of the various components mentioned above can be considered known per se (as is proved by the descriptions in the prior patent documents cited in the introductory part of this description) and/or currently available commercially. For example, a gearbox 2 which can advantageously be used in the context of the invention is constituted by the gearbox sold under the reference ZMS 800 by the company MAVIC.

Figure 2:
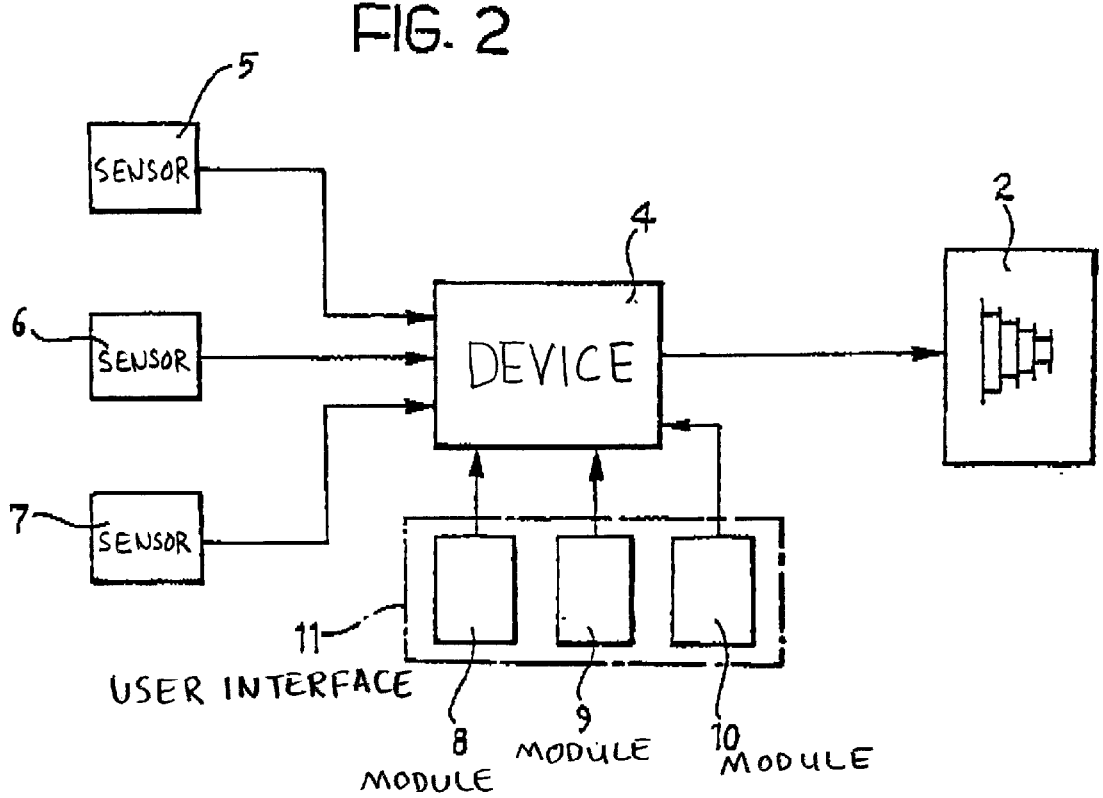
FIG. 2 shows the structure of a system according to the invention schematically in the form of a block diagram.

The block diagram of FIG. 2 shows, in schematic terms, at the level of the general system architecture, the arrangement of connections between the various elements described above, and the control device 4 which receives the signals generated by the sensors 5 to 7 (also defined below as the first, second and third signals) and which acts on the gearbox 2 in order to change the transmission ratio of the gearbox 2 in dependence on the processing operation described further below.

A set of sensors of this type (which can provide the three signals mentioned in digital form) is available under the trade name SRM TRAINING SYSTEM from the company Ingenieurbüro Schoberer.

The further functional blocks indicated 8 and 10 indicate that the method according to the invention allows the user to intervene in the operation of the system, in particular with regard to two basic factors, that is:

the way in which the device 4 interprets or classifies (as will be described further below) the values of the signals received from the sensors 5 to 7, and the processing logic implemented by the device 4 with a view to acting on the gearbox 2.

In particular, in the currently-preferred embodiment, the system according to the invention allows the following factors to be taken into account, by respective selective control interventions;

the cyclist's level of preparation and fitness (module 8), the riding or racing strategy adopted by the cyclist (module 9) and, in general, the rules which the user intends to be followed in the automatic management of the transmission control function (module 10).

BASIC PRINCIPLES THE INVENTION

Before proceeding with the detailed description of a possible embodiment of the invention, it seems useful to describe briefly the basic principles upon which the invention is based. This will be done with specific reference to its possible application in the cycling field.

It is a fact that, for given peripheral conditions (physical characteristics, athletic preparation, type of bicycle, gradient of the road and atmospheric conditions; e.g. opposing or favouring wind, etc.), the maximum power which a cyclist can transfer to the bicycle is achieved in the region of a very precise pedalling frequency which in practice is identified by the speed of rotation (revolutions per minute or rpm) imparted to the pedal crank.

This is due to the fact that, given a certain resisting load, there is always an optimal impedance match between the resisting load and the frequency such as to maximize the power produced, that is, to maximize efficiency.

These remarks are confirmed by numerous scientific works such as, for example:

Gregor, R. J. and Rugg S. G. (1986), "Effects of saddle height and pedalling cadence on power output and efficiency", in E. R. Burke (Ed.), Science of cycling (pp. 69–90). Champaign, IL: Human Kinetics;

Kyle C. R. and Caiozzo, V. J. (1986), "Experiments in human ergometry as applied to the design of human powered vehicles", International Journal of Sports Biomechanics, 2, 6–19; and Allan V. Abbott and David Gordon Wilson (1995), "Human-Powered Vehicles", (p. 35–37), IL: Human Kinetics.

For a given resisting load, the bicycle enables a condition of impedance match, and hence an optimal frequency to be selected by changing the transmission ratios. In practice, the cyclist is comparable to a high-efficiency motor which can produce its best output in terms of power produced within a fairly narrow band of pedalling frequencies (or cadences) By altering the ratios, the cyclist can keep his pedalling action within this band of greatest efficiency. In practice, if the frequency is too low (below 60/75 rpm), the risk of muscle damage increases, whereas if it is too high (90/120 rpm) the cyclist starts to go into oxygen deficit.

Figure 3:
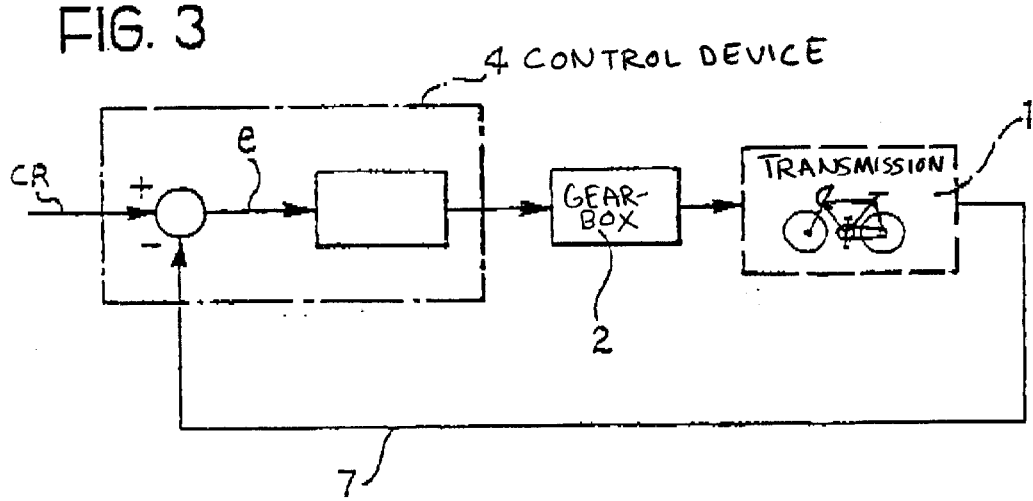
FIGS. 3 and 4 show the general criteria of the operation of a system according to the invention in two successive levels of detail.

By way of direct conceptual reference (but this should not be seen as indicative of a precise analogy of the functional blocks) the criterion of maximizing the power output by arranging for the cyclist always to be able to pedal at the optimal frequency can be represented in the form of the control diagram shown in FIG. 3.

Figure 4:
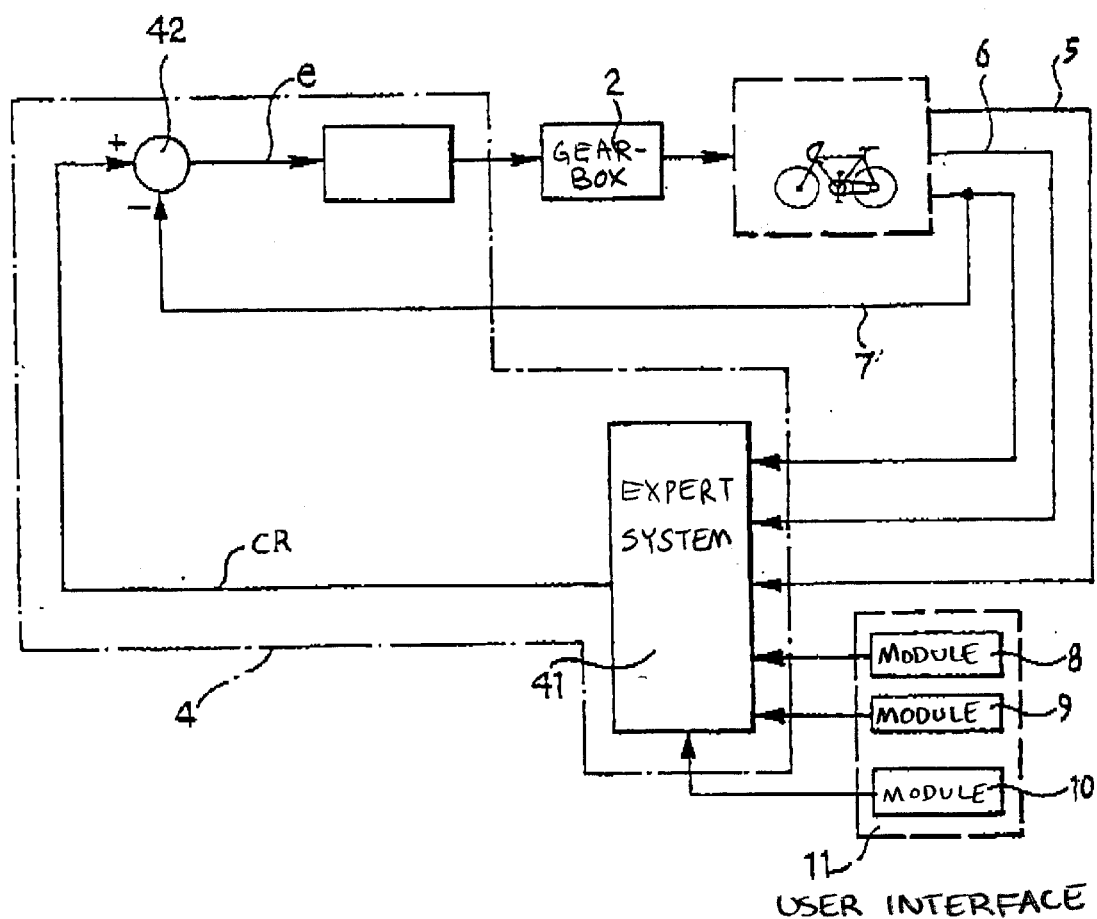

In this diagram, block 1 indicates the bicycle system as a whole. The operating conditions of the system are determined (with regard to the transmission ratio) by what may be defined, by the conventional terminology of automatic control theory, as an "actuator" (constituted, in the specific example, by the gearbox 2). The control system, shown schematically in the form of the device 4, can therefore act on the actuator 2 (in dependence on the signals of the sensors, as shown best in the diagram of FIG. 4 which will be referred to below) so as to implement a feedback operation directed towards minimizing the deviation or error "e" which may be found between a theoretical reference frequency CR and the actual frequency determined from the corresponding signal generated by the sensor 7.

In practice, when the error signal (e) is above a predetermined, possibly variable, threshold, this causes the actuator 2 to be driven in a manner such as to change the transmission ratio so as to bring the signal (e) back below the predetermined threshold. In practice (speaking in deliberately schematic terms) the transmission ratio (understood as the ratio between output speed and input speed) is reduced when the pedalling frequency tends to fall (for example, because the cyclist is pedalling uphill or against the wind) and is increased when the frequency tends to rise (for example, because the cyclist is pedalling downhill or with a favourable wind).

From this last point of view, the method according to the invention may be implemented either with the use of the specific criteria described further below with reference to FIG. 5 and the following Figures (basically with the use of a so-called expert system, preferably of the "fuzzy" type) or, in less preferred embodiments, by adopting systems which perform the control operation (action on the gearbox/actuator 2 so as to minimize the deviation between the reference frequency CR and the actual pedalling frequency) with the use of mechanisms of different types for processing the signals, for example, of the type described in the various documents cited in the introductory part of the present description.

DETAILED DESCRIPTION OF AN EMBODIMENT OF THE INVENTION

The important element of the invention is that, instead of providing for operation on the basis of a reference frequency value CR which is fixed or predetermined (possibly selectively) the system according to the invention determines the reference frequency value CR (in accordance with a substantially adaptive criterion, preferably implemented in real time or substantially in real time) by deriving the reference frequency from the very parameters (pedalling effort, forward speed, actual pedalling frequency, etc.) which characterize the interaction between the cyclist and the bicycle at the time in question. All of this takes place in accordance with intervention criteria which can be determined and controlled selectively by the user.

The importance of this factor can be understood better if it is noted that the reference frequency CR is not static and determinable a priori, even selectively. In fact it depends, on the one hand, upon the resisting load (which in turn depends on various factors) and, on the other hand, on further external factors.

For example, the dependence of the reference frequency CR on the resisting load may be expressed as a dependence on factors such as:

the torque exerted on the pedal crank (the torque required to maintain a constant speed varies with variations of the characteristics of the track), and the speed (aerodynamic resistance, which is a function of the square of the speed, increases as the speed increases).

Dependence on other factors, on the other hand, includes factors such as, for example:

racing strategy: the cyclist may decide to pedal for a race, for a sprint, or simply for a tiring translocation, in accordance with criteria which express his will, and hence a basically predictive behaviour projected into the future and not based on parameters detected and/or detectable in the past or in the present, and the cyclist's level of preparation; the more the cyclist has trained and prepared, the better he will be able to sustain high frequencies, or lower frequencies but with greater effort produced.

The control device 4 preferably comprises a so-called expert system operating in accordance with a fuzzy logic. The fuzzy logic and the respective operating mechanisms are known per se, as are the advantages which this type of logic brings to complex problems the solution of which is based more on empirical considerations resulting from experiment and simulation than on mathematical modelling of the problem.

For general information on these subjects, for example, the reference work by Mohammad JAMSIDI, Nader VADIEE, and Timothy J. ROSS—"Fuzzy Logic And Control" (1993)—IL: Prentice Hall, may usefully be consulted.

Figure 5:
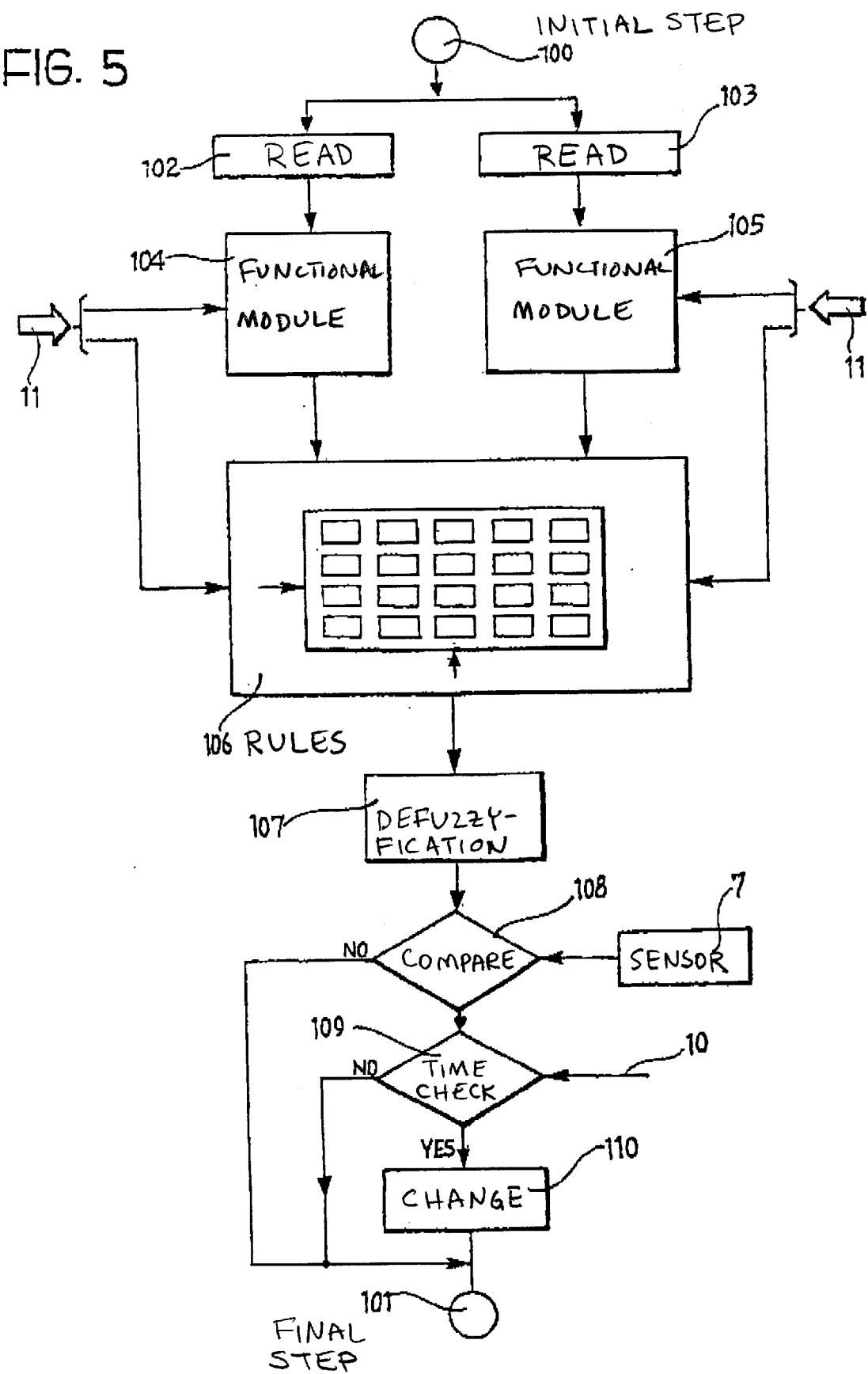
FIG. 5 shows the operation of the system according to the invention in the form of a flow chart.

The flow chart of FIG. 5 shows a sequence of steps, between an initial step 100 and a final step 101, which is intended to be repeated by the control device 4 in order to perform an automatic control of the actuator constituted by the gearbox 2 and hence of the transmission ratio of the bicycle.

The reference to automatic operation does not, however, mean that a bicycle 1 equipped with the system according to the invention should necessarily provide only for automatic operation. As in known systems, the cyclist can in fact exclude the operation of the system so as to be able to act on the transmission unit or transmission units manually in conventional manner (it is pointed out once more that the method according to the invention way be applied only to one or to both of the derailers normally provided on a sports cycle) or to provide for some form of semi-automatic operation. In any case, these methods of operation and of complete or partial deactivation of the system are such as not to require detailed description herein.

To concentrate attention on automatic operation, it is pointed out again that the sequence of steps between steps 100 and 101 can be implemented with a periodic cadence and/or at a certain frequency which may be fixed or variable according to need, in dependence on specific requirements of use. In particular, the frequency of repetition of the steps described below does not need to be very high since, even in transitory racing stages, changes in the bicycle system 1 develop fairly slowly over time when compared with the processing speed of conventional electronic apparatus. The above-mentioned control sequence may be repeated, for example, at intervals of about 1 second.

The action on the gearbox 2 in order to change the transmission ratio preferably provides for a certain low-pass filtering effect. This is to prevent instantaneous variations of one or more of the parameters used by the expert system 41 being translated into an undesired immediate change of the transmission ratio: for example, there might be a sudden change in the pedalling effort due to the fact that the cyclist has risen from the saddle upon starting to pedal, so to speak "standing" on the pedals; above all, the above-mentioned change may have a different sign in dependence on the instantaneous angular position of the pedal crank at the moment at which the cyclist starts to pedal standing up. Moreover, it seems advantageous, in any case, to prevent changes in transmission ratio, possibly with opposite signs, taking place in rapid succession.

The description of the operation of the expert system 41 will be given below, upon the assumption that the expert system receives at its input exclusively the signals corresponding to the pedalling force or effort (sensor 5) and to the speed of the bicycle (sensor 6). This selection is dictated both by reasons of simplicity of description and by the consideration that a skilled person familiar with the design and construction of expert systems will certainly have no difficulty in also including the third parameter (actual pedalling frequency) in the operation of the system. However, this latter parameter may be used by the expert system purely to perform, at the node indicated 42 in FIG. 4, a comparison between this parameter and the reference frequency CR defined by the expert system on the basis of the signals coming from the sensors 5 and 6 and in order to calculate the current gear ratio 2, if it is not available by other means.

In other words, the expert system 41 may take account of the signal corresponding to the actual pedalling frequency in at least two different ways, that is:

on the basis of the method shown in FIG. 5, by identifying the signal corresponding to the reference frequency CR solely on the basis of the pedalling effort signal and of the speed signal, using the signal corresponding to the actual pedalling frequency coming from the sensor 7 purely for generating the error signal (signal e) used to control the gearbox 2, and on the basis of a variant, not shown explicitly, also using the signal relating to the actual pedalling frequency to define the reference frequency CR.

Basically, the expert system 41, operating in accordance with a fuzzy logic, converts the values of the input variables (for example, the signals read from the sensors 5, 6 and—possibly—7) into a linguistic description in order then to work out a control strategy contained in a set of logic rules. The result is then converted back into a precise and unambiguous output datum.

With reference to the flow chart of FIG. 5, the steps indicated 102 and 103 indicate the initial steps in which the system reads the signals coming from the sensor 5 (pedalling effort) and the sensor 6 (speed), respectively. These are preferably signals already converted into digital form beforehand at the outputs of the respective sensors, as is the case in the SRM sensors already mentioned above. If this is not the case, the conversion is performed, in knowm manner, in the device 4.

In the subsequent steps 104, 105, the expert system converts each of the two variables read as inputs into fuzzy values, that is, linguistic values such as "high", medium", "low", medium-high", etc. In order to perform these attributions, it makes use of predefined functions which reflect the degree of affinity of the fuzzy variables to the various fuzzy values (affinity functions).

Figure 6:
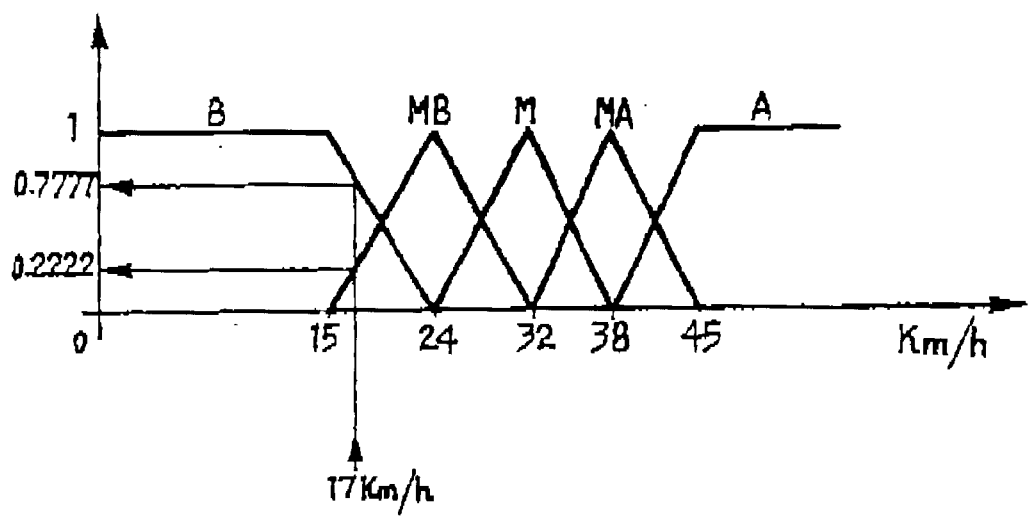
FIGS. 6 and 7 are further graphs indicative of the criteria (affinity functions) for the operation of the system.

The affinity function relating to speed preferably has a curve of the type shown in FIG. 6 in which the abscissa scale corresponds to the speed value (sensor 6) expressed in km/h. It should be noted that there are 5 fuzzy values (linguistic values: B=low, MB=medium low, M=medium, MA=medium high, A=high).

Figure 7:
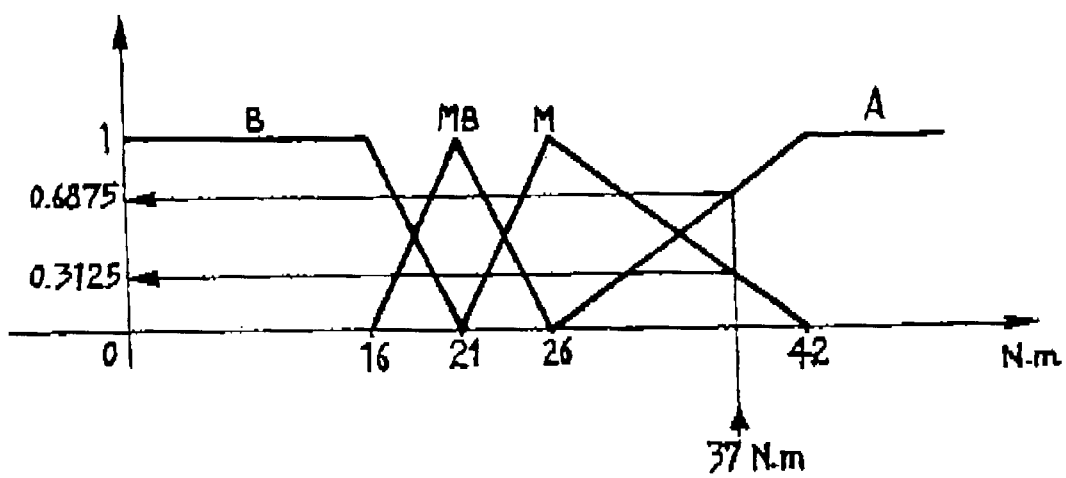

The affinity function relating to torque preferably has a curve of the type shown in FIG. 7 in which the abscissa scale corresponds to the value of the pedalling torque (pedalling effort or force—sensor 5) expressed in N.m. There are 4 fuzzy values (B, MB, M, A).

Again, it should be stated that the steps illustrated by boxes 102 to 105 have been shown as theoretically performed by a parallel processing method for each input parameter since this representation is, above all, more readily understood. It will be clear to experts that the same result can be achieved by serial processes.

It will also be noted that the flow chart of FIG. 5 makes clear that it is possible to intervene in steps 104, 105 by means of commands applied by the user by means of interface modules 8, 9 and 10. These interfaces may in fact be incorporated in a user interface 11 such as, for example, a keypad or an analogue control module disposed, for example, on the handlebars (FIG. 1) in a position readily accessible to the cyclist.

The logic of the attribution of linguistic values to the data corresponding to the signals coming from the sensors 5 and 6 may in fact vary in dependence on various parameters set selectively on the interface modules 8, 9, 10.

For example, the cyclist's level of athletic preparation (module 8) may mean that a speed or a pedalling effort which is to be considered high for an amateur or recreational cyclist may be considered differently (for example, medium-high, medium or even low) for a professional cyclist.

In exactly the same way, with reference to the function of the module 9, to which a role of identifying racing strategy has been attributed, clearly, a speed and/or pedalling effort value considered high during a translocation stage, even within a cycling race, may be considered low or even very low with reference to a sprint or a timed race.

The foregoing also applies in identical manner to the module 10 which supervises the general definition of the rules of operation of the expert system. In this case, the intervention may, for example, be that of intervening in the operation to define the above-described affinity functions by removing or adding affinity functions; an amateur or recreational cyclist will usually be less interested in a very sophisticated differentiated definition of the above-mentioned functions than a professional for whom the need continuously to achieve a close adaptation of the bicycle system to his physical performance may be very pressing and decisive.

The box indicated 106 represents schematically the set of functions of the expert system dedicated to the definition of the reference frequency as a result of the attribution of the affinity functions performed in steps 104 and 105.

In a possible embodiment (which is known per se to experts in the design of these systems and therefore does not require a detailed description herein), the criterion for the application of the above-mentioned rules may be regarded as a type of scanning of a matrix table, for example, a two-dimensional table of which the lines are identified by the affinity functions relating to the speed and the columns are identified by the affinity functions relating to the pedalling effort. With reference to the examples given in FIGS. 6 and 7 (which provide for five and four fuzzy values, respectively), there may be 5×4=20, or more corresponding rules. If the parameter relating to the actual pedalling frequency is also present, the corresponding affinity functions identify the third dimension of the matrix structure (which in any case is implemented with fuzzy logic and hence with respective boxes identified by probability functions).

The rules implemented in box 106 can be written in explicit form in the following manner:

A) if the speed is LOW and the torque is HIGH THEN the reference frequency is LOW B) if the speed is MEDIUM LOW and the torque is HIGH THEN the reference frequency is MEDIUM LOW C) if the speed is LOW and the torque is MEDIUM THEN the reference frequency is MEDIUM LOW D) if the speed is MEDIUM LOW and the torque is MEDIUM THEN the reference frequency is MEDIUM LOW etc.

In terms of the value (VALCR) of the reference frequency value CR, the output fuzzy values could be:

VALCR LOW=68 rpm
VALCR MEDIUM LOW=78 rpm
VALCR MEDIUM=86 rpm
VALCR MEDIUM HIGH=92 rpm
VALCR HIGH=95 rpm Naturally, as is well known to experts in the design of fuzzy systems, the system may also conclude that, in certain conditions, the value "medium" should be attributed to the reference frequency CR at 25% and "low" at 90%. As is well known to experts in fuzzy logic, each fuzzy value is independent of the others so that it is wholly legitimate for the system to reach the conclusions set out above, that is, with a sum of the fuzzy values other than 100%.

It will also be appreciated that—in accordance with per se known criteria—the set of functions indicated schematically by the block 106 may be rendered variable in dependence on the parameters set by the user by acting on the interface 11; this applies in particular with regard to the possibility of modifying the rules which determine the attribution of the reference frequency value in dependence on the affinity functions corresponding to the input parameters so as to be able to implement different sets of rules.

It is also possible to provide—in accordance with known criteria—for the expert system 41 to be able to store the above-mentioned set of rules or possibly several sets of rules to be used in different conditions, in dependence on learning cycles, that is, to provide for a stage for the training of the system in which the cyclist acts on the transmission, changing the ratios by means of a positive action by the cyclist (an expression of his will) in dependence on various riding conditions whilst the system learns the respective rules, subsequently applying them automatically when this operating criterion is subsequently selected.

The above-mentioned control mechanism and, in particular, the learning mechanism, may be implemented with the use of the configurations currently known as neural or neurone networks which, as is well known, can be applied well to the implementation (and to the learning) of operating data and conditions which are purely phenomenological and cannot be expressed directly in the form of a mathematical model, particularly of an algorithmic type.

In the step indicated 107, the expert system 41 implements a reverse conversion mechanism known as "defuzzyfication" in which the fuzzy values of the output variable are combined to produce a precise value of the reference frequency parameter CR.

The operating criteria described above can be understood even better on the basis of the practical example described below.

PRACTICAL EXAMPLE

At a given moment, the speed value (sensor 6)=17 km/h and the torque value (sensor 5)=37 N.m are measured.

From the first affinity function it is found that:

LOW speed=0.7777
MEDIUM LOW speed=0.2222
MEDIUM speed=0
MEDIUM HIGH speed=0
HIGH speed=0

From the second affinity function it is found that:

LOW torque=0
MEDIUM LOW torque=0

MEDIUM torque=0.3125
HIGH torque=0.6875
From rule A)→LOW reference frequency=min (0.7777, 0.6875)=0.6875
From rule B)→MEDIUM LOW reference frequency=min (0.2222, 0.6875)=0.2222
From rule C)→MEDIUM LOW reference frequency=min (0.7777, 0.3125)=0.3125
From rule D)→MEDIUM LOW reference frequency min=min (0.2222, 0.3125)=0.2222
Thus, by combining the result of rule A with itself:
LOW reference frequency=0.6875.
By combining the result of rules B), C), D)→MEDIUM LOW reference frequency=max. (0.2222, 0.3125, 0.2222)= 0.3125 .
At this point it is necessary to apply defuzzyfication, starting from the fuzzy output values Reference frequency:
LOW=0.6875
MEDIUM LOW=0.3125
MEDIUM=0
MEDIUM HIGH=0
For example, if $$Cr = \frac{\sum_{i=1}^{5} CR_i \cdot VALCR_i}{\sum_{i=1}^{5} CR_i}$$

it follows that $$CR = \frac{0.6875 \cdot 68 + 0.3125 \cdot 78 + 0.86 + 0.92 + 0.95}{0.6875 + 0.3125 + 0 + 0 + 0} = \frac{71.25}{1} = 71.25$$

With reference once more to the flow chart of FIG. 5 in step 108, the reference frequency value thus obtained is compared (as also shown more specifically at the node 42 which is actually included in the expert system 41) with the pedalling frequency value derived by the sensor 7.

If the respective modulus of the deviation (error signal "e") is below a given threshold, the system does not intervene, going on to the final step 101, thus deciding in practice not to act on the gearbox 2 and that the question of a possible change of the transmission ratio is to be reconsidered upon the next checking sequence.

If, however, it is detected that the amount of the deviation value is above the given threshold and therefore such as to require intervention, the system goes on to a further step 109 and then to yet another subsequent step 110, in which the action on the gearbox 2 is actually implemented so as to bring about the change in ratio (an increase or a decrease) in dependence on the adaptation requirements found, that is, in dependence on the sign of the deviation value "e".

The step indicated 109 (which is optional and may in any case also be implemented in another form, for example, simply by going to the final step 101) corresponds to a time check (in practice a filtering mechanism) in which the device 4 ascertains that an adequate period of time has elapsed since the preceding change in ratio. If a period of time less than a predetermined time threshold has elapsed (negative result of the comparison step 109) the system goes directly to the final step 101 without acting on the gearbox 2, postponing any ratio changing operation to a subsequent control sequence.

If, however, an adequate period of time has elapsed, the system goes on to step 110, changing the transmission ratio.

With reference to step 109, it has been explained that by acting on the interface 11 and, in particular, on the module 10 (relating to the changing of the operating rules of the system) the cyclist can selectively vary the value of the time threshold used to perform the filtering function.

In this case also, whereas an amateur or recreational cyclist may consider it preferable to have a sufficiently long period of time (in particular to avoid having too "sensitive" a system which changes the transmission ratio every time the need to act in this sense is recognized, even for short periods of time), a professional cyclist who is more skilled and practised in evaluating and controlling his physical performance may wish to reduce this period, possibly greatly, so as to have a system which can adapt very quickly to different ways adopted by the cyclist for interacting with the bicycle system 1.

Naturally, the principle of the invention remaining the same, the details of construction and forms of embodiment may be varied widely with respect to those described and illustrated, without thereby departing from the scope of the present invention.

What is claimed is:

1. A system for controlling a variable-ratio transmission mounted on an apparatus (1), the transmission being associated with:
   an actuator (2) for changing the transmission ratio, and
   operating means (3) for applying an input driving force to the transmission by a periodic action of given frequency,
   the system comprising:
      the first sensor means (5) which are sensitive to the driving force and can generate a respective first signal,
      second sensor means (6) which are sensitive to the speed of operation of the apparatus (1) and can generate a respective second signal, and
      a control device (4) which is sensitive to the first signal and to the second signal and which can control the actuator (2) in dependence on the first signal and the second signal,
   and the system including that:
      third sensor means (7) which are sensitive to the given frequency and which can generate a respective third signal are provided,
      the control device (4) is configured to determine, from at least the first signal and the second signal, a reference signal indicative of a reference value for the frequency (CR),
      the control device(4) can compare (42, 108) the reference signal and the third signal so as to identify a corresponding deviation signal (e), and
      the control device (4) is configured to act on the actuator (2), changing the transmission ratio so as to minimize the deviation signal (e).

2. A system according to claim 1, including that:
   the first sensor means (5) comprise a device for measuring the pedalling force applied to a pedal crank (3) of a bicycle (1) and the second sensor means comprise a sensor for detecting the forward speed of the bicycle (1), and
   the control device (4) is a control device which can act on at least one gearbox (2) mounted on the bicycle (1).

3. A system according to claim 1, including that the control device (4) is configured so as to determine the frequency reference signal (CR) also in dependence on the third signal.

4. A system according to claim 1, including that the control device (4) comprises:
- a first functional module (104) which is sensitive (102) to the first signal and can classify the first signal in dependence on a respective first degree of affinity,
- a second functional module (105) which is sensitive (103) to the second signal and can classify the second signal in dependence on a respective second degree of affinity,
- a third functional module for the application of rules (106), which is sensitive to respective values of the first and second degrees of affinity and can determine the frequency reference value (CR) with values differentiated in dependence on the values of the first and second degrees of affinity.

5. A system according to claim 4, including that it comprises at least one control module (8, 9, 10) operable selectively in order to vary selectively at least one of:
- a criterion for the attribution of the first degree of affinity by the first functional module (104),
- a criterion for the attribution of the second degree of affinity by the second functional module (105), and
- a law for the determination of the frequency reference value (CR) by the third functional module (106) from the degrees of affinity attributed by the first functional module (104) and the second functional module (105) and the first and second signals.

6. A system according to claim 4, including that the first, the second and the third functional modules (104, 105, 106) operate in accordance with a fuzzy logic.

7. A system according to claim 5 including that the at least one control module (8, 9, 10) comprises at least one of:
- a first functional control module (8) for selectively varying the criterion for the attribution of the first and second degrees of affinity by the first and second functional modules (104, 105) in dependence on the cyclist's athletic level,
- a second functional control module (9) for selectively varying the criterion for the attribution of the first and second degrees of affinity by the first and second functional modules (104, 105) in dependence on various strategies for the riding of the bicycle (1), and
- a third functional control module (10) for selectively varying the rules for determining the frequency reference value (CR) given by the third functional module (106).

8. A system according to claim 1, including that the control device (4) includes a function (109) for inhibiting action on the actuator (2) for a period of time of predetermined duration starting from the preceding action performed by the control device (4) on the actuator (2) in order to change the transmission ratio.

9. A system according to claim 8, including that the duration of the time interval is variable selectively.

10. A method of controlling a variable-ratio transmission mounted on an apparatus (1), the transmission being associated with:
- an actuator (2) for changing the transmission ratio, and
- operating means (3) for applying an input driving force to the transmission by a periodic action of given frequency, the method comprising the steps of:
  - detecting (5) the driving force and generating a respective first signal,
  - detecting (6) the speed of operation of the apparatus (1) and generating a respective second signal, and
  - controlling the actuator (2) in dependence on the first and second signals, and including that it comprises the steps of:
  - detecting (7) the given frequency and generating a respective third signal,
  - determining, from at least the first signal and the second signal, a reference signal indicative of a reference value (CR) for the frequency,
  - comparing (42, 108) the reference signal and the third signal so as to identify a corresponding deviation signal (e), and
  - controlling the actuator (2), changing the transmission ratio so as to minimize the deviation signal (e).

11. A method according to claim 10, including that it comprises the steps of:
- generating the first signal as a signal indicative of the pedalling force applied to a pedal crank (3) of a bicycle (1),
- generating the second signal as a signal indicative of the forward speed of the bicycle itself (1), and
- controlling, as the actuator (2), at least one gearbox mounted on the bicycle (1).

12. A method according to claim 10, including that it comprises the step of determining the frequency reference value (CR) also in dependence on the third signal.

13. A method according to claim 10, including that it comprises the steps of:
- classifying (104) the first signal in dependence on a respective first degree of affinity,
- classifying (105) the second signal in dependence on a respective second degree of affinity, and
- determining the frequency reference value (CR) with values differentiated in dependence on the values of the first and second degrees of affinity.

14. A method according to claim 13, including that it comprises the steps of selectively varying at least one of:
- a criterion for the attribution of the first degree of affinity,
- a criterion for the attribution of the second degree of affinity, and
- a law for the determination of the frequency reference value (CR) from the degrees of affinity attributed to the first and second signals.

15. A method according to claim 14, including that the criteria for the attribution and the law for the determination are based on a fuzzy logic.

16. A method according to claim 11, including that it comprises at least one of the steps of:
- selectively varying the criterion for the attribution of the first and second degrees of affinity in dependence on the cyclist's athletic level,
- selectively varying the criterion for the attribution of the first and second degrees of affinity in dependence on various strategies for the riding of the bicycle, and
- selectively varying the rules for the determination of the frequency reference value (CR) from the degrees of affinity.

17. A method according to claim 10, including that it comprises the step of inhibiting action on the actuator (2) for a period of time of predetermined duration starting from the preceding action performed on the actuator in order to change the transmission ratio.

18. A method according to claim 17, including that the duration of the period of time is variable selectively.

* * * * *